(12) United States Patent
Diaz et al.

(10) Patent No.: US 8,892,283 B2
(45) Date of Patent: *Nov. 18, 2014

(54) METHOD AND APPARATUS TO CONTROL A MULTI-MODE POWERTRAIN SYSTEM

(75) Inventors: Michael Glenn Diaz, Ann Arbor, MI (US); Sean W. McGrogan, Ann Arbor, MI (US); Anthony H. Heap, Ann Arbor, MI (US)

(73) Assignee: GM Global Technology Opeations LLC, Detroit, MI (US)

( * ) Notice: Subject to any disclaimer, the term of this patent is extended or adjusted under 35 U.S.C. 154(b) by 194 days.

This patent is subject to a terminal disclaimer.

(21) Appl. No.: 13/547,096

(22) Filed: Jul. 12, 2012

(65) Prior Publication Data

US 2014/0018983 A1 Jan. 16, 2014

(51) Int. Cl.
*G06F 17/11* (2006.01)

(52) U.S. Cl.
USPC ............................................. 701/22; 701/51

(58) Field of Classification Search
USPC .................................................... 701/22, 51
See application file for complete search history.

(56) References Cited

U.S. PATENT DOCUMENTS 7,645,206 B2 1/2010 Holmes et al.
2005/0080537 A1* 4/2005 Cawthorne et al. .............. 701/51

OTHER PUBLICATIONS

U.S. Appl. No. 13/444,773, Unpubl, Tan, et al.
U.S. Appl. No. 13/495,037, Unpubl, Hessell, et al.

* cited by examiner

*Primary Examiner* — Mary Cheung
*Assistant Examiner* — Yuen Wong

(57) ABSTRACT

A method for controlling a powertrain system includes determining minimum and maximum states for an object component of interest based upon a plurality of linear constraints that are associated with operating parameters for the torque machines and the multi-mode transmission. Minimum and maximum objective battery powers are determined based upon the minimum and maximum states for the object component of interest. When the minimum and maximum objective battery powers are outside the minimum and maximum battery power limits, a problem recomposition process is executed to recompose the minimum and maximum battery power limits and the linear constraints. Recomposed minimum and maximum states for the object component of interest are determined based upon the recomposed minimum and maximum battery power limits and the recomposed linear constraints. The recomposed minimum and maximum states for the object component of interest are employed to control the powertrain system.

19 Claims, 6 Drawing Sheets

US 8,892,283 B2

METHOD AND APPARATUS TO CONTROL A MULTI-MODE POWERTRAIN SYSTEM

TECHNICAL FIELD

This disclosure is related to multi-mode powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

Known transmission devices employ torque-transfer clutch devices to transfer torque between the engine, the torque machines and the driveline. Operation of a powertrain system includes activating and deactivating the clutches to effect operation in selected operating states.

SUMMARY

A powertrain system includes an internal combustion engine, a multi-mode transmission having a plurality of torque machines, and a driveline. A method for controlling a powertrain system includes determining minimum and maximum states for an object component of interest based upon a plurality of linear constraints that are associated with operating parameters for the torque machines and the multi-mode transmission. Minimum and maximum objective battery powers are determined based upon the minimum and maximum states for the object component of interest. When the minimum and maximum objective battery powers are outside the minimum and maximum battery power limits, a problem recomposition process is executed to recompose the minimum and maximum battery power limits and the linear constraints. Recomposed minimum and maximum states for the object component of interest are determined based upon the recomposed minimum and maximum battery power limits and the recomposed linear constraints. The recomposed minimum and maximum states for the object component of interest are employed to control the powertrain system.

BRIEF DESCRIPTION OF THE DRAWINGS

One or more embodiments will now be described, by way of example, with reference to the accompanying drawings, in which:

FIG. 2-1 graphically shows a two-dimensional perspective of highest priority, independent constraints X1 and X2 in relation to battery power for an operating point, in accordance with the disclosure;

FIG. 2-2 graphically shows a three-dimensional perspective of transformed motor torques in relation to transformed battery power limits, in accordance with the disclosure;

FIG. 2-3 graphically shows the three-dimensional perspective of transformed motor torques in relation to transformed battery power limits shown with reference to FIG. 2-2, and depicting only the portion of the motor torques that intersects with the battery power, in accordance with the disclosure;

FIG. 2-4 graphically shows the three-dimensional perspective of motor torques in relation to battery power shown with reference to FIG. 2-2, and depicting dependent component torque and/or acceleration constraints that are described as $Y2, Y3, \ldots Yn$, in accordance with the disclosure;

FIG. 2-5 graphically shows a three-dimensional perspective of motor torques in relation to battery power shown with reference to FIG. 2-2, and depicting only a circumscribed cylindrical portion of the motor torques that intersects with the battery power and subject to the dependent constraints depicted with reference to FIG. 2-4, in accordance with the disclosure;

FIG. 3 schematically shows a control scheme to control operation of an embodiment of the powertrain system described with reference to FIG. 1, in accordance with the disclosure;

FIG. 4 schematically shows a non-linear problem recomposition process, which is applied to non-linear constraints to determine recomposed minimum and maximum battery power limits, in accordance with the disclosure;

FIG. 5 schematically shows a linear problem recomposition process that is applied to linear constraints to determine recomposed minimum and maximum constraints for each of the component torque and/or acceleration constraints, in accordance with the disclosure.

DETAILED DESCRIPTION

Figure 1:
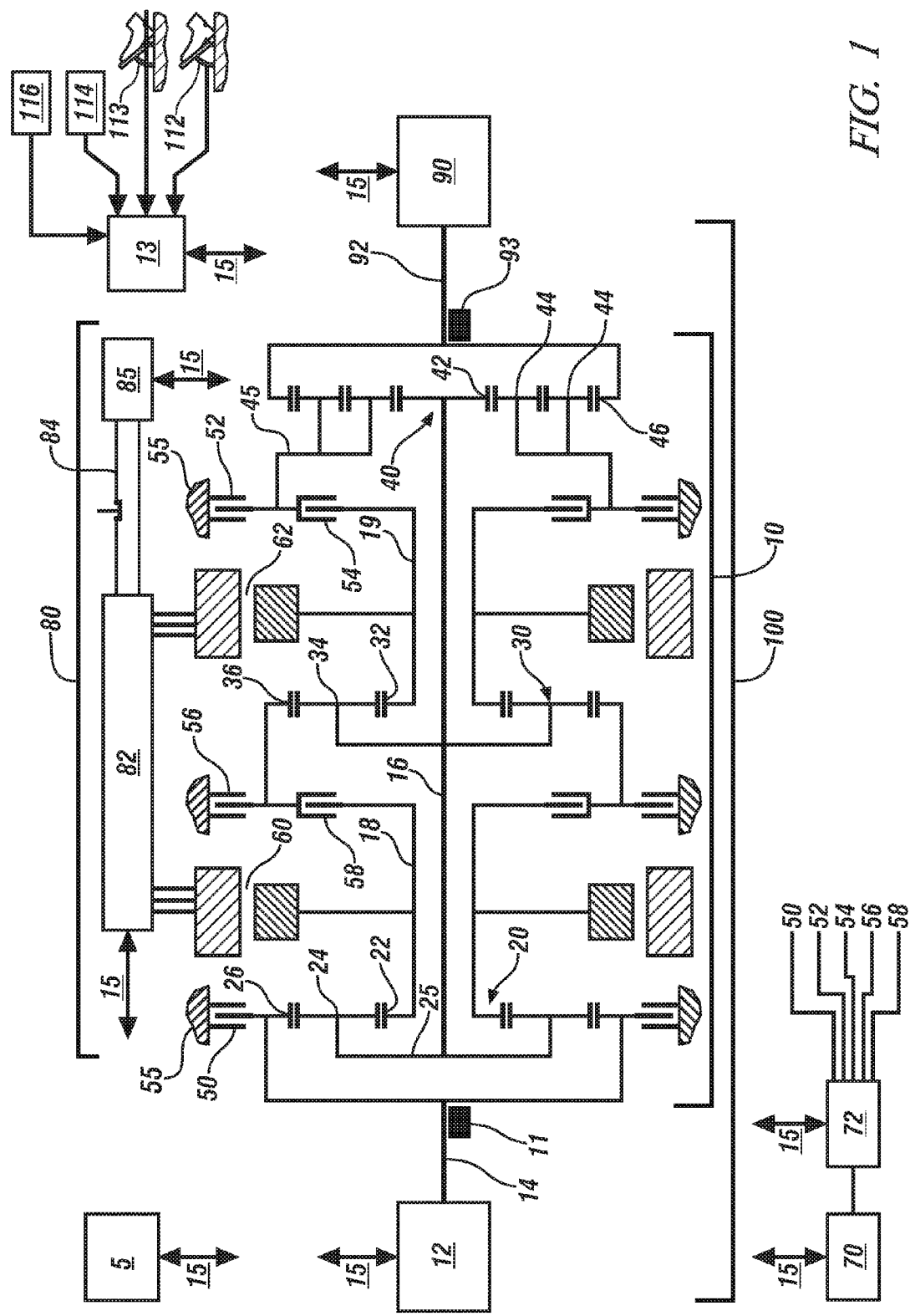
FIG. 1 schematically shows a multi-mode powertrain system including an internal combustion engine, transmission, driveline, and a controller, in accordance with the disclosure.

Referring now to the drawings, wherein the showings are for the purpose of illustrating certain exemplary embodiments only and not for the purpose of limiting the same, FIG. 1 depicts a non-limiting powertrain system 100 including an internal combustion engine (engine) 12, a multi-mode transmission (transmission) 10, a high-voltage electrical system 80, a driveline 90, and a controller 5. The transmission 10 mechanically couples to the engine 12 and first and second torque machines 60 and 62 respectively, and is configured to transfer torque between the engine 12, the torque machines 60, 62, and the driveline 90. As illustrated, the first and second torque machines 60, 62 are electric motor/generators.

The high-voltage electrical system 80 includes an electrical energy storage device (ESD) 85 electrically coupled to a transmission power inverter control module (TPIM) 82 via a high-voltage electrical bus 84, and is configured with suitable devices for monitoring electric power flow including devices and systems for monitoring electric current and voltage. The ESD 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14. Power output from the engine 12, i.e., rotational speed multiplied by engine torque, can differ from the input speed and the input torque to the transmission 10 due to placement of torque-consuming components on the input member 14 between the engine 12 and the transmission 10, e.g., a torque management device. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60 and 62, respectively.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to first and second torque machines 60 and 62, respectively. The transmission 10 is configured to transfer torque among the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, brakes, and band clutches. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board algorithms, or using other suitable methods.

The first and second torque machines 60 and 62 are three-phase AC motor/generator machines, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear 30. Each of the resolvers is signally and operatively connected to the transmission power inverter control module (TPIM) 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 is rotatably connected to the driveline 90 to provide output power to the driveline 90 that is transferred to one or a plurality of vehicle wheels via differential gearing or a transaxle or another suitable device. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second torque machines 60 and 62 are generated as a result of energy conversion from fuel or electrical potential stored in the electrical energy storage device (ESD) 85. The ESD 85 is high voltage DC-coupled to the TPIM 82 via the high-voltage electrical bus 84 that preferably include a contactor switch that permits or prohibits flow of electric current between the ESD 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 85 to AC power for powering respective ones of the first and second torque machines 60 and 62, by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the ESD 85 to charge and discharge the ESD 85.

The controller 5 signally and operatively links to various actuators and sensors in the powertrain system via a communications link 15 to monitor and control operation of the powertrain system, including synthesizing information and inputs, and executing algorithms to control actuators to meet control objectives related to fuel economy, emissions, performance, drivability, and protection of hardware, including batteries of ESD 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The powertrain 100 is configured to operate in one of a plurality of powertrain states, including a plurality of ranges of the transmission 10 and engine states of on and off. When the engine is in the off state, it is unfueled, not firing, and is not spinning. When the engine is in the on state it is fueled, firing, and spinning. The engine may also operate in a fuel cutoff mode, wherein it is spinning but is unfueled and not firing. The transmission 10 is configured to operate in one of a plurality of neutral (neutral), fixed gear (Gear #), variable mode (EVT Mode #), electric vehicle (EV#) and transitional (EV Transitional State # and pseudoGear #) states by selectively activating the clutches C1 150, C2 152, C3 154, C4 156, and C5 158. A pseudoGear state is a variable mode state in which torque output from the transmission is directly proportional to input torque from the engine, and is primarily employed during shifts between EVT modes. Table 1 depicts a plurality of powertrain states including transmission states and engine states for an embodiment of the powertrain 100.

TABLE 1

| Range | Engine State | C1 | C2 | C3 | C4 | C5 |
|---|---|---|---|---|---|---|
| Neutral 1 | on/off | | | | | |
| Neutral 2 | on/off | | | x | | |
| Neutral 3 | on/off | | | | x | |
| PseudoGear 1 | on/off | x | | | | |
| PseudoGear 2 | on/off | | x | | | |
| Neutral | off | | | | | x |
| EVT Mode 1 | on/off | x | | x | | |
| EVT Mode 2 | on/off | x | | | x | |

TABLE 1-continued

| Range | Engine State | C1 | C2 | C3 | C4 | C5 |
|---|---|---|---|---|---|---|
| EVT Mode 3 | on/off | | x | | x | |
| EVT Mode 4 | on/off | | x | x | | |
| EV Transitional State 1 | off | x | | | | x |
| EV Transitional State 2 | off | | x | | | x |
| Gear 1 | on | x | | x | x | |
| Gear 2 | on | x | x | | x | |
| Gear 3 | on | | x | x | x | |
| EV1 | off | x | | x | | x |
| EV2 | off | x | | | x | x |
| EV3 | off | | x | | x | x |
| EV4 | off | | x | x | | x |
| EV Transitional State 3 | off | x | x | | | x |
| Neutral | on/off | | | x | x | |
| PseudoGear 3 | on/off | x | x | | | |
| Neutral | off | | | x | | x |
| Neutral | off | | | | x | x |

Figures 1, 2:
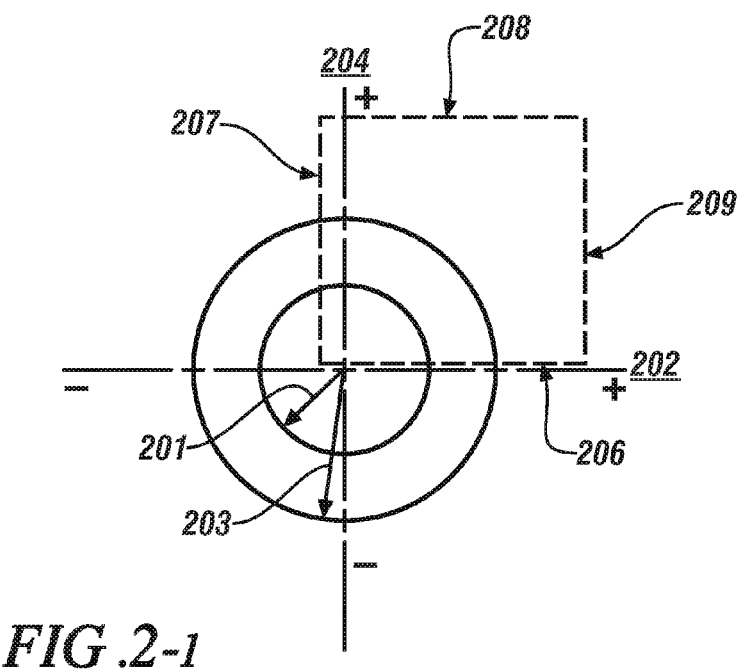
Figure 2:
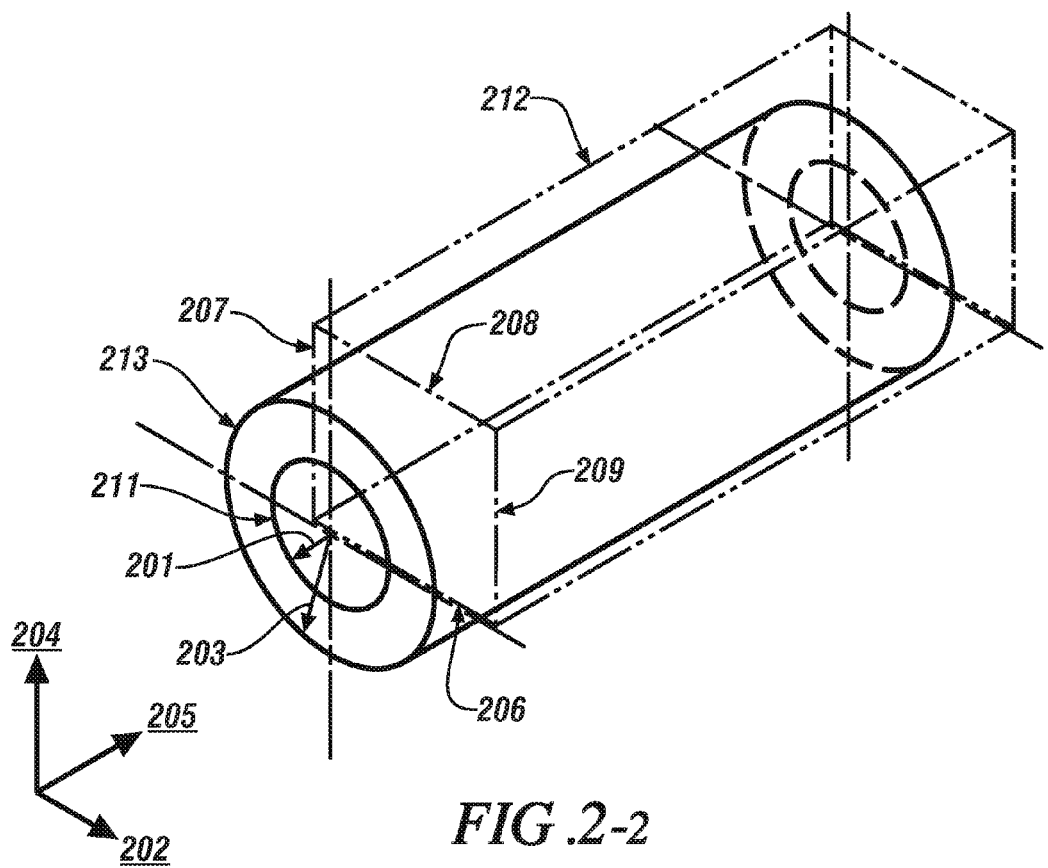

FIG. 2-1 graphically shows a two-dimensional perspective of highest priority, independent constraints X1 and X2 in relation to battery power for an operating point, with constraint X1 having limits of X1-min 207 and X1-max 209 and constraint X2 having limits X2-min 206 and X2-max 208. In one embodiment the highest priority independent constraints X1 and X2 are motor torques, i.e., Ta and Tb for the first and second torque machines 60, 62 shown in relation to battery power for an operating point, wherein the motor torques and battery powers have been transformed to a multi-dimensional coordinate system referred to herein as Tx/Ty space. Tx and Ty are shown with reference to coordinate dimensions 202 and 204, respectively. Battery power is transformed to Tx/Ty space with minimum and maximum battery power limits Pbat-min and Pbat-max, respectively, represented as concentric circles having radii of Pbat-min 201 and Pbat-max 203. As previously stated, the motor torques Ta and Tb are considered as highest priority constraints, referred to herein as X1 and X2. Alternatively, other constraints may be employed. The highest priority constraints X1 and X2, e.g., motor torques Ta and Tb are correspondingly transformed to linear constraints as follows. In one embodiment the motor torques Ta and Tb representing torque commands for the first and second torque machines 60 and 62 are transformed to the Tx/Ty coordinate system as follows:

$$\begin{bmatrix} Tx \\ Ty \end{bmatrix} = \begin{bmatrix} A_1 & 0 \\ 0 & B_1 \end{bmatrix} * \begin{bmatrix} T_A \\ T_B \end{bmatrix} + \begin{bmatrix} A_2 \\ B_2 \end{bmatrix} \quad [1]$$

wherein
Tx is the transformation of motor torque Ta to Tx/Ty space;
Ty is the transformation of motor torque Tb to Tx/Ty space; and
$A_1, A_2, B_1, B_2$ are application-specific scalar values.

In this manner, EQ. 1 represents the transformation of motor torque Ta to Tx and the transformation of motor torque Tb to Ty.

Battery power is represented in the following relationships.

$$Pbat = (Tx^2 + Ty^2) + C \quad [2]$$

$$Pbat = R^2 + C \quad [3]$$

EQ. 2 represents the battery power Pbat transformed into Tx/Ty space. The battery power range between the maximum and minimum battery power limits Pbat-min and Pbat-max be calculated and graphed as radii (Rmin 201 and Rmax 203) with a center at locus (0, 0) in the Tx/Ty space, wherein:

$$Rmin = SQRT(Pbat\text{-}min - C)$$

$$Rmin = SQRT(Pbat\text{-}max - C)$$

The minimum and maximum battery power limits Pbat-min and Pbat-max correlate to various conditions, e.g. state of charge, temperature, voltage and usage (amp-hour/hour). The parameter C, above, is defined as the absolute minimum possible battery power at given motor speeds Na and Nb, ignoring motor torque limits. Physically, when Ta=0 and Tb=0 the mechanical output power from the first and second torque machines 60, 62 is zero. Physically Tx=0 and Ty=0 correspond to a maximum charging power condition for the ESD 85. The positive sign (+) is defined as discharging power from the ESD 85, and the negative sign (−) is defined as charging power into the ESD 85. The maximum battery power limit, i.e., Rmax 203 defines a maximum discharge battery power and the minimum battery power limit, i.e., Rmin 201 defines a maximum charge battery power.

FIG. 2-2 graphically shows a three-dimensional perspective of the transformed motor torques in relation to transformed battery power limits shown with reference to FIG. 2-1, with the motor torque and battery power having been transformed to Tx/Ty space, with Tx coordinate dimension 202 and Ty coordinate dimension 204 and a third Tz coordinate dimension 205 that corresponds to a third independent constraint X3. Cylinders 211 and 213 emerge with the Tz coordinate dimension 205, with cylinder 213 representing the maximum battery power limit, i.e., Rmax 203 extending in the Tz coordinate dimension 205 and defining the maximum discharge battery power, and cylinder 211 representing the minimum battery power limit, i.e., Rmin 201 and extending in the Tz coordinate dimension 205 and defining the maximum charge battery power.

A parallelepiped 212 emerges with the Tz coordinate dimension 205, representing the minimum and maximum X1 constraints 206 and 208, respectively, and minimum and maximum X2 constraints 207 and 209, respectively, each and extending in the Tz coordinate dimension 205 with the third independent constraint X3.

Figures 2, 3:
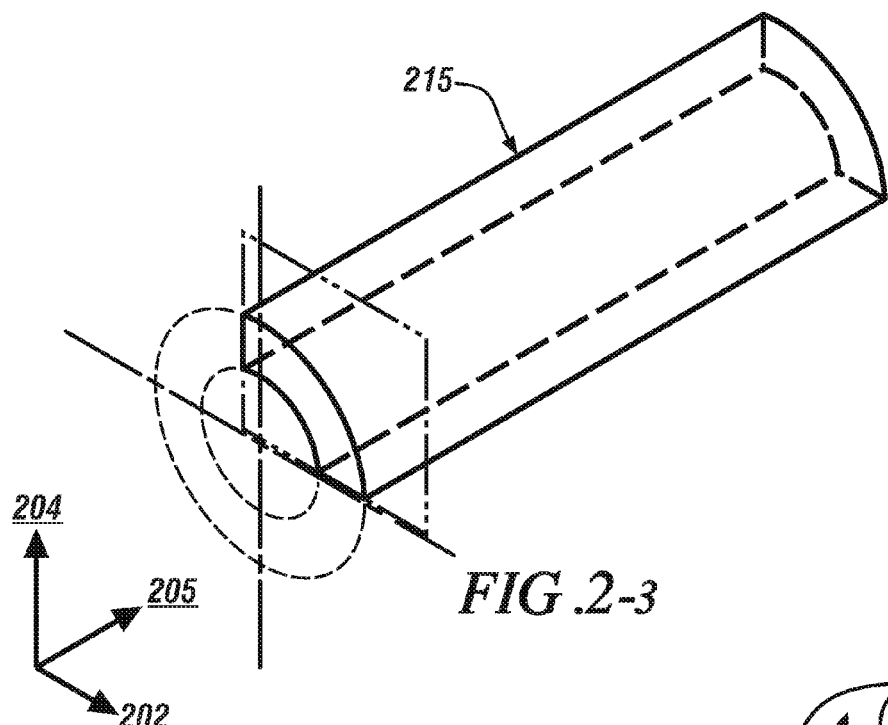

FIG. 2-3 graphically shows the three-dimensional perspective of transformed motor torques in relation to transformed battery power limits shown with reference to FIG. 2-2, and depicting only the portion 215 of the motor torques that intersects with the battery power.

Figures 2, 3, 4:
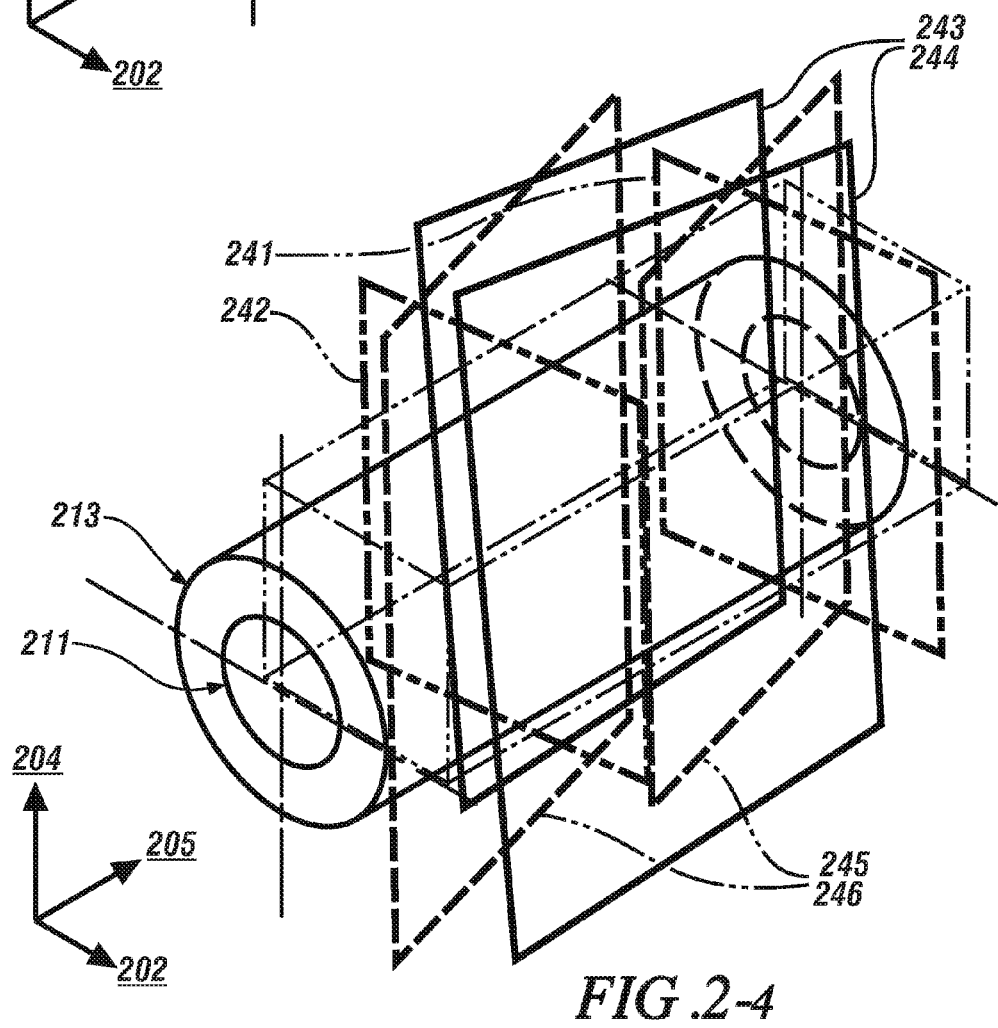

FIG. 2-4 graphically shows the three-dimensional perspective of motor torques in relation to battery power shown with reference to FIG. 2-2, and depicting dependent component torque and/or acceleration constraints that are generically described as Y2, Y3, . . . Yn, and are accorded lower priorities. Three sets of the Yn dependent constraints are shown including minimum and maximum constraints for Y2, i.e., Y2-min 241 and Y2-max 242, minimum and maximum constraints for Y3, i.e., Y3-min 243 and Y3-max 244, and minimum and maximum constraints for Y4, i.e., Y4-min 245 and Y4-max 246.

FIG. 2-5 graphically shows the three-dimensional perspective of motor torques in relation to battery power shown with reference to FIG. 2-2, and depicting only the portion of the motor torques that intersects with the battery power and subject to the Y2, Y3, . . . Yn dependent constraints depicted with reference to FIG. 2-4. This is depicted as a circumscribed cylindrical portion 250.

FIG. 3 schematically shows a control scheme 300 periodically executed in one of the aforementioned control modules to control operation of an embodiment of the powertrain system described with reference to FIG. 1. Table 2 is provided as a key to FIG. 3 for the control scheme 300 wherein the numerically labeled blocks and the corresponding functions are set forth as follows.

TABLE 2

| BLOCK | BLOCK CONTENTS |
|---|---|
| 302 | Identify inputs, including: objective component equation; linear component equations, each with minimum and maximum limits; actuator minimum and maximum limits; and battery power equations representing Pbat-min and Pbat-max limits |
| 304 | Solve linear constraints problem to determine objective linear minimum and maximum states for Y1 (Y1_min and Y1_max) based upon the linear minimum and maximum states for X1, X2 and X3 |
| 306 | Calculate Pbat-obj-max and Pbat-obj-min based upon objective linear minimum and maximum states |
| 308 | Compare Pbat-obj-max and Pbat-obj-min and corresponding maximum and minimum battery power limits |
| 310 | The linear solution including the objective linear minimum and/or maximum states is the solution for the complete problem |
| 312 | Examine minimum and maximum objective battery powers-is it obvious to determine on which of the outside walls of the circumscribed cylindrical portion the solution falls? |
| 314 | Solve the objective component equation to determine final minimum and maximum values for Y1, i.e., Y1_min and Y1_max based upon the linear component equations, the actuators' minimum and maximum limits, and the battery power equations |
| 316 | The solution for the objective component equation is the solution for the complete problem |
| 320 | Execute Problem recomposition process to determine recomposed minimum and maximum values for the constraint Yn (Yn-min-rec, Yn-max-rec) and recomposed minimum and maximum battery power limits, (Pbat-min-rec and Pbat-max-rec) |
| 322 | Determine final minimum and maximum values for Y1, i.e., Y1_min and Y1_max based upon the recomposed objective linear minimum and maximum states for the X1, X2 and X3 constraints using Yn-min-rec, Yn-max-rec |
| 324 | Determine Pbat-obj-max-rec and Pbat-obj-min-rec |
| 326 | Compare Pbat-obj-max-rec, Pbat-obj-min-rec with Pbat-max-rec, Pbat-min-rec |
| 328 | The solution for the objective component equation using the recomposed minimum and maximum values for the constraint Yn (Yn-min-rec, Yn-max-rec) and recomposed minimum and maximum battery power limits, (Pbat-min-rec and Pbat-max-rec) is the solution for the complete problem final minimum and maximum values for Y1, i.e., Y1_min and Y1_max |
| 330 | Obvious solution for Y1_min and Y1_max relates to the minimum and maximum battery power limits |
| 332 | Solve the objective component equation to determine final minimum and maximum values for Y1, i.e., Y1_min and Y1_max based upon the linear component equations, the actuators' minimum and maximum limits, and the battery power equations |
| 334 | Y1_min, Y1_max is the solution |

The control scheme 300 is configured to determine allowable minimum and maximum states for an object component of interest, e.g., minimum and maximum torques or rotational speed/accelerations that an associated component can carry or produce while subject to constraints imposed by the powertrain system taking into account both linear and non-linear constraints. Exemplary linear and non-linear constraints are graphically depicted in FIGS. 2-1 through 2-5. Linear constraints refer to those constraints that vary linearly with regard to independent constraints X1, X2, and X3, and can be represented by equations of the general form as follows wherein A is a matrix of scalars, X is a vector of independent constraints and B is a vector of scalars.

$$Y = AX + B$$

Non-linear constraints refer to those constraints that vary non-linearly with regard to independent constraints. Non-Linear constraints allows for two constraints. One non-linear constraint is battery power, which varies in a parabolic manner with changes in load, from which maximum and minimum battery powers may be determined, e.g., Pbat-max and Pbat-min. The non-linear constraint is of the following form.

$$P\text{bat}^2 = (X1^2 + X2^2) + C \quad [4]$$

As described herein, the non-linear constraints must be expressed in the form of EQ. 4, and the non linear constraints cannot be a function of independent constraint X3. Inputs are initially identified, and include an objective component equation, linear component equations, each with minimum and maximum limits, actuator minimum and maximum limits, and battery power equations representing Pbat-min and Pbat-max limits (302).

Operations of the various components and actuators associated with the powertrain system can be characterized using equations. In an embodiment employing two torque machines, there can be one objective component equation, three linear component equations each having minimum and maximum limits, and three minimum and maximum limits associated with actuators.

One exemplary objective component equation is of the following form.

$$Y1 = aX1 + bX2 + cX3 + d \quad [5]$$

The term Y1 225 represents the object component of interest, e.g., a torque or a rotational speed and acceleration associated with an element of the powertrain system, and a, b, c, and d are known scalar values. The terms X1, X2, and X3 represent equations associated with the highest priority and independent constraints in the system. The actuators can include X1 and X2 representing the first and second torque machines 60, 62. The actuators may include X3 as engine torque, or another suitable component state such as clutch acceleration, clutch torque, or output torque, by way of example. The minimum and maximum battery power limits, Pbat-min and Pbat-max, respectively are represented as EQ. 4, above, and graphically correspond to cylinders, e.g., cylinders 211 and 213 depicted and described with reference to FIG. 2-2. In one embodiment, the relationship described in EQ. 5 is subject to linear constraints as follows:

$$Y2\_\min \leq Y2 = a2*X1 + b2*X2 + c2*X3 + D2 \leq Y2\_\max$$

$$Y3\_\min \leq Y3 = a3*X1 + b3*X2 + c3*X3 + D3 \leq Y3\_\max$$

$$Y4\_\min \leq Y4 = a4*X1 + b4*X2 + c4*X3 + D4 \leq Y4\_\max$$

$$X1\_\min \leq X1 \leq X1\_\max$$

$$X2\_\min \leq X2 \leq X2\_\max$$

$$X3\_\min \leq X3 \leq X3\_\max \quad [6]$$

wherein a2, a3, a4, b2, b3, b4, c2, c3, and c4 terms are scalar values.

In one embodiment, the relationship described in EQ. 6 is subject to non-linear constraints as follows.

$$P\text{bat-min} \leq P = \text{SQRT}(X1^2 + X2^2) \leq P\text{bat-max} \quad [7]$$

As used herein, Y2, Y3, Y4 represent dependent component torque and/or acceleration constraints characterized with linear component equations, each with minimum and maximum limits, and X1, X2, X3 represent three independent actuators characterized by minimum and maximum limits. Thus, a solution to finding minimum and maximum values for the object component of interest, i.e., maximum and minimum torques or accelerations that an associated component can carry or produce while subject to constraints imposed by the powertrain system can be visualized as pairs of parallel planes cutting through a cylinder, as depicted in FIG. 2-4. The objective component equation is solved by employing the parallel cutting planes as constraints, wherein the solution is within the sets of parallel planes and is on the outside wall surface of the selected cylinder, i.e., one of cylinder 211 or cylinder 213, using EQ. 5, above.

The actuators can include X1 and X2 representing the first and second torque machines 60, 62. The actuators may include X3 as the engine 10, or another suitable component state such as clutch acceleration, engine torque, a clutch torque, or an output torque, by way of example. The minimum and maximum battery power limits Pbat-min and Pbat-max are represented as non-linear equations that correspond to cylinders, e.g., cylinders 211 and 213 depicted and described with reference to FIG. 2-2. The objective component equation shown with reference to EQ. 5 is solved using the aforementioned equations, with the exception of the non-linear equations representing the minimum and maximum battery power limits, to achieve a linear solution that includes minimum and maximum linear states for the object component of interest Y1, i.e., Y1_min and Y1_max based upon the linear minimum and maximum states for the X1, X2 and X3 constraints (304). Minimum and maximum objective battery powers are calculated for the minimum and maximum linear states for Y1_min and Y1_max based upon the linear minimum and maximum states for the X1, X2 and X3 constraints, and are represented as Pbat-obj-min and Pbat-obj-max (306). The minimum and maximum objective battery powers are each compared with a corresponding one of the minimum and maximum battery power limits employing the non-linear equations that correspond to cylinders (308).

When either the minimum or maximum objective battery power is within the corresponding minimum and maximum battery power limits (308)(1), the linear solution including the objective linear minimum and/or maximum states is the solution for the complete problem (310). This iteration of the control scheme 300 is complete when the linear solution including the objective linear minimum and maximum states is the solution for the complete problem.

When either of or both of the minimum and maximum objective battery powers are outside the minimum and maximum battery power limits (308)(0), the solution is incomplete. The corresponding solution falls on an outside wall of the circumscribed cylindrical portion 250 shown with reference to FIG. 2-5. Otherwise, the solution to the problem is not feasible, and there is a need to execute recomposition to achieve a feasible solution.

The linear solution, i.e., the minimum and maximum objective battery powers are examined to determine whether it is obvious to determine on which of the outside walls of the circumscribed cylindrical portion 250 the solution falls, i.e., whether it is obvious to determine that the solution is associated with either the minimum battery power limit or the maximum battery power limit (312). This is described with reference to FIG. 6. When it is obvious to determine that the solution is associated with one of the minimum battery power limit and the maximum battery power limit (312)(1), the objective component equation (EQ. 5) is solved based upon the three linear component equations each having minimum and maximum limits, minimum and maximum limits for "n" quantity of actuators, (EQ. 6) and the battery power equation (EQ. 7) to determine final minimum and maximum values for Y1, i.e., Y1_min and Y1_max (314). One method for solving the objective component equation includes executing a numerical iterative search method to find a solution for the objective component equation, and the solution for the objective component equation is the solution for the complete problem (316).

When it is not obvious to determine on which of the outside walls of the circumscribed cylinder 250 the solution falls (312)(0), a non-linear problem recomposition process is executed (320). The problem recomposition process specifies priorities to the constraints of the powertrain system. The constraint priorities are based upon physical capabilities of the various actuators and evaluations of effects of violating one of the constraints upon component or system durability, driveability, fuel consumption, and other factors. In one embodiment, the highest priorities are accorded to constraints corresponding to torque outputs of the torque machines, followed by battery power constraints, followed by other torque and acceleration constraints, e.g., constraints associated with clutch synchronization. Other suitable priorities may be employed. As such, the problem recomposition process attempts to determine final minimum and maximum values for Y1, i.e., Y1_min and Y1_max while maintaining higher priority constraints and violating lower priority constraints in a structured manner.

In one embodiment, the non-linear problem recomposition process is applied to constraints associated torque actuators, e.g., motor torques associated with the first and second torque machines 60, 62, i.e., Ta and Tb, constraints associated with battery power, i.e., Pbat-max and Pbat-min, and a plurality of the other dependent component torque and/or acceleration constraints, i.e., the Y2, Y3, . . . Yn constraints. The generic dependent constraints Yn permit a system designer to select and specify priorities to other component torque and/or acceleration constraints in a manner suitable for a specific application. The problem recomposition process does not recompose the highest priority and linearly independent constraints, i.e., the motor torques associated with the first and second torque machines 60, 62. The problem recomposition process (320) determines recomposed minimum and maximum values for the dependent constraint Yn (Yn-min-rec, Yn-max-rec), as described with reference a linear problem recomposition process 500 in FIG. 5, and a non-linear problem recomposition process 400 in FIG. 4.

The objective linear minimum and maximum states for the X1, X2 and X3 constraints, i.e., the objective linear minimum and maximum motor torques (determined at Block 304) and the recomposed minimum and maximum values for the plurality of the dependent constraints Yn (Yn-min-rec, Yn-max-rec) associated with other component torque and/or acceleration constraints (determined with reference to FIG. 5) are solved to determine a linear solution that includes recomposed objective linear minimum and maximum states for the X1, X2 and X3 constraints, e.g., objective linear minimum and maximum motor torques (322). The recomposed objective linear minimum and maximum states for the X1, X2 and X3 constraints are employed to determine recomposed minimum and maximum objective battery powers, represented as Pbat-obj-max-rec and Pbat-obj-min-rec (324). The recomposed minimum and maximum objective battery powers are each compared with a corresponding one of the minimum and maximum battery power limits (Pbat-max-rec, Pbat-min-rec) employing the non-linear equations that correspond to the cylinders 211 and 213 representing the minimum and maximum battery power limits as shown with reference to FIG. 2-2 (326). When the recomposed minimum and maximum objective battery powers are within the corresponding one of the minimum and maximum battery power limits (326)(1), the solution for the objective component equation determined using the recomposed minimum and maximum values for the constraint Yn (Yn-min-rec, Yn-max-rec) and recomposed minimum and maximum battery power limits, (Pbat-min-rec and Pbat-max-rec) is the solution for the complete problem, including final minimum and maximum values for Y1, i.e., Y1_min and Y1_max (328). Otherwise (326)(0), the obvious solution relates to one of the minimum and maximum battery power limits (330). The objective component equation (EQ. 5) is solved based upon "n" linear component equations associated with the X1, X2, and X3 constraints, minimum and maximum limits for "n" quantity of actuators (EQ. 6) and the battery power equation (EQ. 7) to determine the final minimum and maximum values for Y1, i.e., Y1_min and Y1_max (332).

One method for solving the objective component equation includes executing a numerical iterative search method to find a solution for the objective component equation, and the solution for the objective component equation becomes the solution for the complete problem. Thus, the final minimum and maximum values for Y1, i.e., Y1_min and Y1_max are set equal to the solution obtained in block 332 (334).

FIG. 4 schematically shows a non-linear problem recomposition process 400, which is applied to non-linear constraints including the constraints associated with the minimum and maximum battery power limits, i.e., Pbat-min and Pbat-max. The non-linear problem recomposition process 400 is executed to determine recomposed minimum and maximum battery power limits, i.e., Pbat-min-rec and Pbat-max-rec. Table 3 is provided as a key for the control scheme 400 of FIG. 4 wherein the numerically labeled blocks and the corresponding functions are set forth as follows.

TABLE 3

| BLOCK | BLOCK CONTENTS |
|---|---|
| 402 | Find Pbat-max within X1, X2 limit rectangle Find Pbat-min within X1, X2 limit rectangle |
| 404 | Is there an intersection with minimum and maximum battery power limits Pbat-min, Pbat-max? |
| 406 | Pbat-min-rec and Pbat-max-rec set equal to Pbat-min, Pbat-max |
| 408 | Expand Pbat-min, Pbat-max to intersect with X1, X2 limit rectangle |
| 410 | Pbat-min-rec and Pbat-max-rec set equal to expanded Pbat-min, Pbat-max |

For the present powertrain state, the battery power data is evaluated to determine whether the minimum and maximum battery power limits are circumscribed within the highest priority constraints X1 and X2 (402).

The problem described by this operation is shown graphically with reference to FIG. 2-1, wherein the highest priority constraints X1 and X2 define a rectangle that includes constraint X1 shown as X1-min 207 and X1-max 209 and constraint X2 shown as X2-min 206 and X2-max 208 and the minimum and maximum battery power limits are shown as the concentric circles having radii of Pbat-min 201 and Pbat-max 203. The minimum and maximum battery power limits are compared with the highest priority constraints X1 and X2 (404).

It is determined that the minimum and maximum battery power limits are circumscribed within the highest priority constraints X1 and X2 (404)(1) when there are points in common therebetween. This can be determined using a suitable algorithm or other comparative process. This result is shown graphically in FIG. 2-1 wherein there is overlap between the rectangle defined by X1-min 207, X1-max 209, X2-min 206 and X2-max 208 and the area between the concentric circles defined by the radii of Pbat-min 201 and Pbat-max 203. When this result occurs, the recomposed minimum and maximum battery power limits, i.e., Pbat-min-rec and Pbat-max-rec, are equal to the minimum and maximum battery power limits Pbat-min and Pbat-max that were previously determined (406).

It is determined that the minimum and maximum battery power limits are not circumscribed within the highest priority constraints X1 and X2 (404)(0) when there are no points in common therebetween. This can be determined using a suitable algorithm or other comparative process. This result is not shown, but would include a circumstance and corresponding depiction wherein there is no overlap between the rectangle defined by X1-min 207, X1-max 209, X2-min 206 and X2-max 208 and the area between the concentric circles defined by the radii of Pbat-min 201 and Pbat-max 203.

When the minimum and maximum battery power limits are not circumscribed within the highest priority constraints X1 and X2, the minimum and maximum battery power limits are expanded until there is intersection with the rectangle defined by X1-min 207, X1-max 209, X2-min 206 and X2-max 208 that define the highest priority constraints X1 and X2 (408). This may be visualized graphically by increasing or decreasing the radii of Pbat-min 201 and Pbat-max 203 until there is intersection with the highest priority constraints X1 and X2. The expanded minimum and maximum battery power limits are employed to be the recomposed minimum and maximum battery power limits, i.e., Pbat-min-rec and Pbat-max-rec (410).

Figures 2, 3, 4, 5:
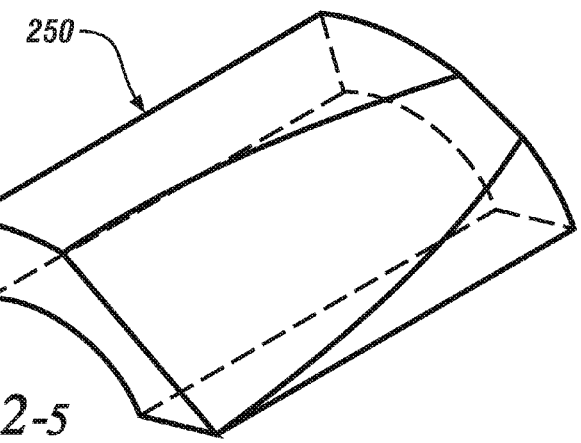
Figure 3:
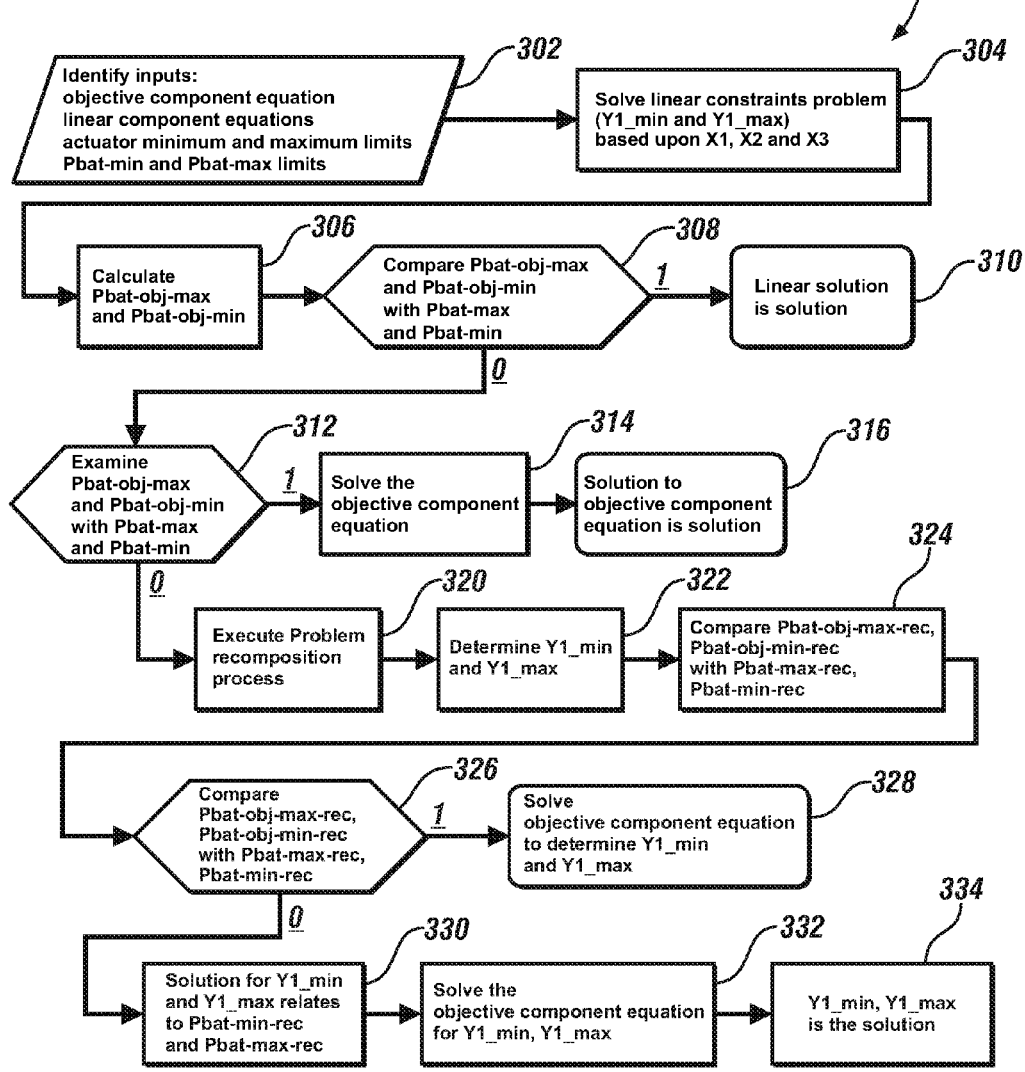
Figure 4:
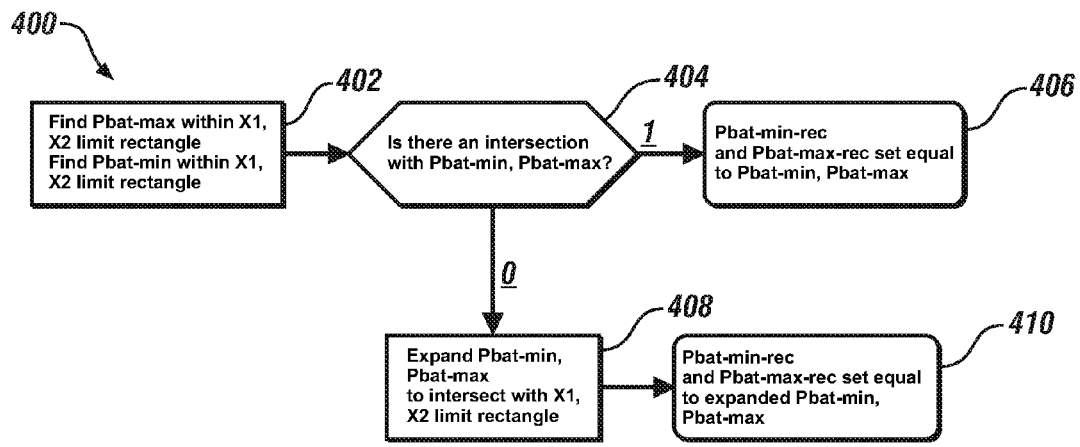

FIG. 5 schematically shows a linear problem recomposition process 500 that is applied to linear constraints including the component torque and/or acceleration constraints that are generically described as Y2, Y3 ... Yn constraints. The linear problem recomposition process 500 is executed to determine recomposed minimum and maximum constraints for each of the component torque and/or acceleration constraints that are generically described as Y2, Y3 ... Yn dependent constraints and graphically depicted with reference to FIG. 2-4. Table 4 is provided as a key for the control scheme 500 of FIG. 5 wherein the numerically labeled blocks and the corresponding functions are set forth as follows. A form of the linear problem recomposition process 500 is executed for each of the Yn constraints to determine minimum and maximum recomposed constraints Yn-min and Y-max, with priority of the constraints arranged from highest to lowest constraint, wherein Y1 is the highest priority constraint.

TABLE 4

| BLOCK | BLOCK CONTENTS |
|---|---|
| 502 | Solve the objective component equation to determine Yn-max-linear, i.e., Yn-max subject to minimum and maximum linear constraints X1, X2, X3 and Y2, Y3, Y4, ..., Y(n − 1) |
| 504 | Is Yn-max-linear within Pbat-min-rec and Pbat-max-rec? |
| 506 | Save Yn-max-rec = Yn-max-linear |
| 508 | Find Yn-max within Pbat-min-rec and Pbat-max-rec |
| 510 | Determine Yn-max-linear by solving the objective component equation based upon the actuator minimum and maximum limits (X1, X2, X3), and Y2, Y3, Y4, ..., Y(n − 1), and the recomposed minimum and maximum battery power limits Pbat-min-rec and Pbat-max-rec |

TABLE 4-continued

| BLOCK | BLOCK CONTENTS |
|---|---|
| 512 | Solve the objective component equation to determine Yn-min-linear, i.e., Yn-min subject to minimum and maximum linear constraints X1, X2, X3 and Y2, Y3, Y4, . . . , Y(n – 1) |
| 514 | Is Yn-min-linear within Pbat-min-rec and Pbat-max-rec? |
| 516 | Save Yn-min-rec = Yn-min-linear |
| 518 | Find Yn-min within Pbat-min-rec and Pbat-max-rec |
| 520 | Determine Yn-min-linear by solving the objective component equation based upon the actuator minimum and maximum limits (X1, X2, X3), and Y2, Y3, Y4, . . . , Y(n – 1), and the recomposed minimum and maximum battery power limits Pbat-min-rec and Pbat-max-rec |
| 522 | Compare Yn-max-rec with Yn-max<br>Compare Yn-min-rec with Yn-min |
| 524 | Find which of Yn-max-rec, Yn-min-rec is closest to Yn-max, Yn-min |
| 526 | Yn-max-rec = Yn-max<br>Yn-min-rec = Yn-min |
| 528 | Yn-max-rec = closest (Yn-max-rec, Yn-min-rec)<br>Yn-min-rec = closest (Yn-max-rec, Yn-min-rec) |

The linear problem recomposition process 500 is executed for each of the component torque or acceleration constraints that are generically described as Y2, Y3, Y4 . . . Yn, wherein "n" designates a numeral associated with the selected constraint. This includes solving the objective component equation shown with reference to EQ. 5 to determine Yn-max-linear, i.e., a maximum value for the constraint Yn subject to the maximum linear constraints X1, X2, X3 and the component torque and/or acceleration constraints Y2, Y3, Y4, . . . , Y(n–1) (502). The maximum value for the constraint Yn subject to the maximum linear constraints X1, X2, X3 is compared to the recomposed battery limits (Pbat-min-rec and Pbat-max-rec) to determine whether it is within the recomposed battery limits (504). If so (504)(1), a recomposed value for the maximum value for the constraint Yn (Yn-max-rec) is set equal to the maximum value for the constraint Yn subject to the maximum linear constraints X1, X2, X3 (Yn-max-linear), and captured for future use (506). Otherwise (504)(0), the control scheme 500 undertakes a process to Find a maximum value for the Yn constraint (Yn-max) that is within the recomposed battery limits (Pbat-min-rec and Pbat-max-rec) (508). This includes determining the maximum value for the constraint Yn subject to the maximum linear constraints X1, X2, X3 (Yn-max-linear) by solving the objective component equation shown with reference to EQ. 5 based upon the actuator minimum and maximum limits (X1, X2, X3), constraints Y2, Y3, Y4, . . . , Y(n–1) and the recomposed minimum and maximum battery power limits (Pbat-min-rec and Pbat-max-rec) (510). The objective component equation is solved based upon the actuator minimum and maximum limits (X1, X2, X3) and the battery power equations to determine a maximum value for the constraint Yn subject to the maximum linear constraints X1, X2, X3 (Yn-max-linear) and the recomposed minimum and maximum battery power limits (Pbat-min-rec and Pbat-max-rec) (510). One method for solving the objective component equation includes executing a numerical iterative search method to find a solution for the objective component equation. The recomposed maximum value for the constraint Yn (Yn-max-rec) is set equal to the maximum value for the constraint Yn subject to the maximum linear constraints X1, X2, X3 (Yn-max-linear) and constraints Y2, Y3, Y4, . . . , Y(n–1), and captured for future use (506).

This includes solving the objective component equation shown with reference to EQ. 5 to determine Yn-min-linear, i.e., a minimum value for the constraint Yn subject to the minimum linear constraints X1, X2, X3 and constraints Y2, Y3, Y4, . . . , Y(n–1) (512). The minimum value for the constraint Yn subject to the minimum linear constraints X1, X2, X3 and constraints Y2, Y3, Y4, . . . , Y(n–1) is compared to the recomposed battery limits (Pbat-min-rec and Pbat-max-rec) to determine whether it is within the recomposed battery limits (514). If so (514)(1), a recomposed value for the minimum value for the constraint Yn (Yn-min-rec) is set equal to the minimum value for the constraint Yn subject to the minimum linear constraints X1, X2, X3 and constraints Y2, Y3, Y4, . . . , Y(n–1) (Yn-min-linear), and captured for future use (516). Otherwise (514)(0), the control scheme 500 undertakes a process to Find a minimum value for the Yn constraint (Yn-min) that is within the recomposed battery limits (Pbat-min-rec and Pbat-max-rec) (518). This includes determining the minimum value for the constraint Yn subject to the minimum linear constraints X1, X2, X3 (Yn-min-linear) by solving the objective component equation shown with reference to EQ. 5 based upon the actuator minimum and maximum limits (X1, X2, X3), constraints Y2, Y3, Y4, . . . , Y(n–1) and the recomposed minimum and maximum battery power limits (Pbat-min-rec and Pbat-max-rec) (520). The objective component equation is solved based upon the actuator minimum and maximum limits (X1, X2, X3) and the battery power equations to determine a minimum value for the constraint Yn subject to the minimum linear constraints X1, X2, X3 (Yn-min-linear), constraints Y2, Y3, Y4, . . . , Y(n–1), and the recomposed minimum and maximum battery power limits (Pbat-min-rec and Pbat-max-rec) (520). One method for solving the objective component equation includes executing a numerical iterative search to find a solution for the objective component equation. The recomposed minimum value for the constraint Yn (Yn-min-rec) is set equal to the minimum value for the constraint Yn subject to the minimum linear constraints X1, X2, X3 (Yn-min-linear), and captured for future use (516).

The recomposed minimum and maximum values for the constraint Yn (Yn-min-rec, Yn-max-rec) are compared with the corresponding original minimum and maximum values for the associated constraints to determine if there is an intersection of the values. The original minimum and maximum values can be as described with reference to FIG. 2-4 include the component torque and/or acceleration constraints of Y2, Y3, . . . Yn constraints including minimum and maximum constraints for Y2, i.e., Y2-min 241 and Y2-max 242, minimum and maximum constraints for Y3, i.e., Y3-min 243 and Y3-max 244, and minimum and maximum constraints for Y4, i.e., Y4-min 245 and Y4-max 246 (522).

When there is intersection between the recomposed minimum and/or maximum values for the constraint Yn (Yn-min-rec, Yn-max-rec) and the corresponding original minimum and maximum values for the associated constraints (522)(1), the recomposed minimum and maximum values for the constraint Yn (Yn-min-rec, Yn-max-rec) are set equal to the corresponding original minimum and/or maximum values for the associated constraints (526).

When there is no intersection between the recomposed minimum and/or maximum values for the constraint Yn (Yn-min-rec, Yn-max-rec) and the corresponding original minimum and maximum values for the associated constraints (522)(0), the recomposed minimum and maximum values for the constraint Yn (Yn-min-rec, Yn-max-rec) are both set equal to one of the corresponding original minimum or maximum values for the associated constraints that is closest (524, 528).

Figure 6:
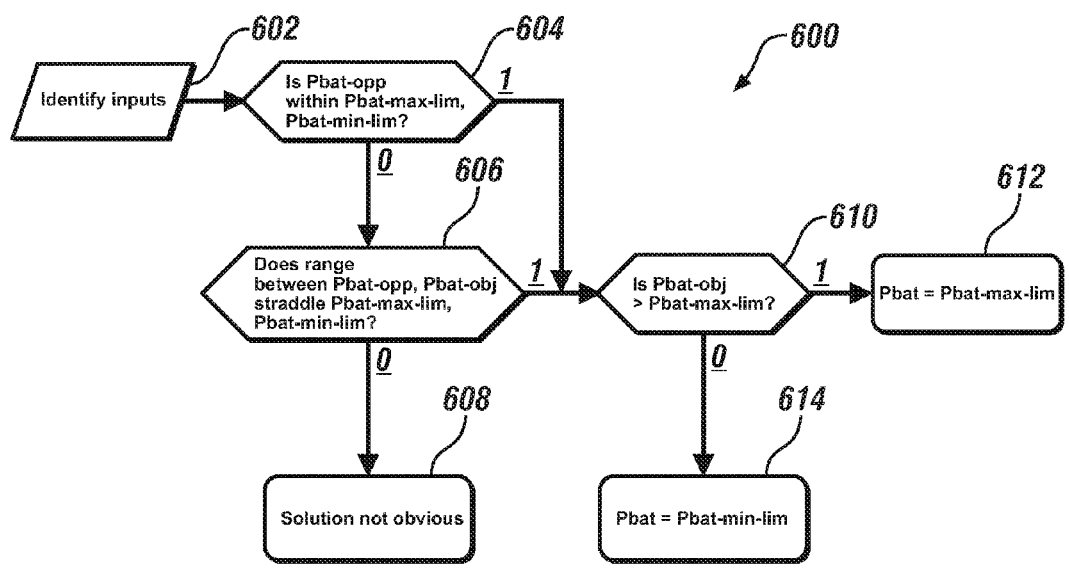
FIG. 6 schematically shows a flowchart for a control scheme to determine which of the minimum and maximum objective battery powers are examined to determine whether the solution is associated with the minimum battery power limit or the maximum battery power limit, in accordance with the disclosure.
Figure 5:
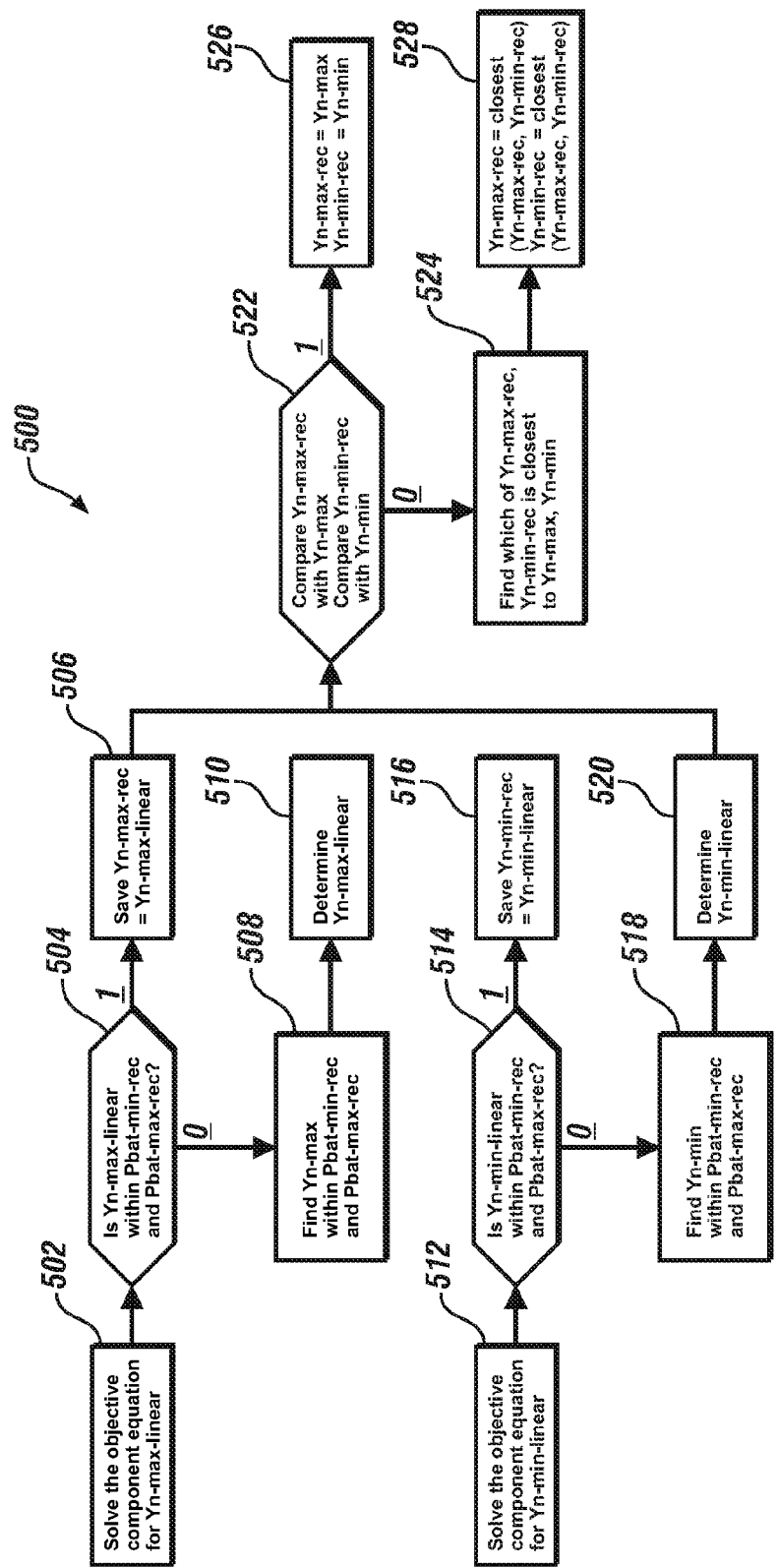

FIG. 6 schematically shows a flowchart for a control scheme 600 described with reference to an embodiment of the powertrain described with reference to FIG. 1 to determine which of the minimum and maximum objective battery powers are examined to determine whether the solution is associated with the minimum battery power limit or the maximum battery power limit. Table 5 is provided as a key for the control scheme 600 of FIG. 6 wherein the numerically labeled blocks and the corresponding functions are set forth as follows.

TABLE 5

| BLOCK | BLOCK CONTENTS |
|---|---|
| 602 | Identify inputs:<br>For an effort to maximize an objective:<br>Pbat-obj = Pbat at max-linear<br>Pbat-opp = Pbat at min-linear<br>Pbat-max-lim<br>Pbat-min-lim<br>For an effort to minimize an objective:<br>Pbat-obj = Pbat at min-linear<br>Pbat-opp = Pbat at max-linear<br>Pbat-max-lim<br>Pbat-min-lim |
| 604 | Is Pbat-opp within range defined between Pbat-max-lim, Pbat-min-lim? |
| 606 | Does range defined between Pbat-opp, Pbat-obj straddle range defined between Pbat-max-lim, Pbat-min-lim? |
| 608 | Solution not obvious |
| 610 | Is Pbat-obj > Pbat-max-lim? |
| 612 | Pbat solution is obvious, equal to Pbat-max-lim |
| 614 | Pbat solution is obvious, equal to Pbat-min-lim |

The control scheme 600 initially identifies inputs (602). The inputs include the minimum and maximum battery power limits (Pbat-min-lim, Pbat-max-lim, respectively) and minimum and maximum objective battery powers (Pbat-obj-min, Pbat-obj-max, respectively) that have been previously determined. An objective battery power limit (Pbat-obj) and an opposed battery power limit (Pbat-opp) are determined as follows to maximize the objective function.

$P$bat-obj=$P$bat-obj-max $P$bat-opp=$P$bat-obj-min

An objective battery power limit (Pbat-obj) and an opposed battery power limit (Pbat-opp) are determined as follows to minimize the objective function.

$P$bat-obj=$P$bat-obj-min $P$bat-opp=$P$bat-obj-max.

The opposed battery power limit (Pbat-opp) is evaluated to determine whether it lies within a power range defined between the minimum and maximum battery power limits (Pbat-min-lim, Pbat-max-lim, respectively) (604). Similarly, a range defined between the opposed battery power limit (Pbat-opp) and the objective battery power limit (Pbat-obj) is evaluated to determine whether it straddles the power range defined between the minimum and maximum battery power limits (Pbat-min-lim, Pbat-max-lim, respectively) (606). When either of the conditions are met (604)(1) or (606)(1), the objective battery power limit (Pbat-obj) is compared with the maximum objective battery power (Pbat-obj-max) (610). When the objective battery power limit (Pbat-obj) is greater than the maximum objective battery power (Pbat-obj-max) (610)(1), the battery power solution is considered obvious and it is the maximum objective battery power (Pbat-obj-max) (612). When the objective battery power limit (Pbat-obj) is less than the maximum objective battery power (Pbat-obj-max) (610)(0), the battery power solution is considered obvious and it is the minimum objective battery power (Pbat-obj-min) (614). When neither of the conditions are met (604)(0) or (606)(0), there is no obvious solution (608).

For the present operating state, the battery power data is evaluated to determine whether the minimum and maximum battery power limits are circumscribed within the highest priority constraints X1 and X2 (402). The problem described by this operation is shown graphically with reference to FIG. 2-1, wherein the highest priority constraints X1 and X2 define a rectangle that includes constraint X1 shown as X1-min 207 and X1-max 209 and constraint X2 shown as X2-min 206 and X2-max 208 and the minimum and maximum battery power limits are shown as the concentric circles having radii of Pbat-min 201 and Pbat-max 203.

The foregoing system facilitates determining system capabilities related to output torque and acceleration, engine torque and acceleration, and motor torque and acceleration for torque machines in view of hardware constraints for a transmission range state. Such information is employed to protect the torque actuators including the torque machines and to protect torque-carrying components (clutches, pinions, etc), and the ESD while being responsive to vehicle acceleration. The control scheme finds global minimum and maximum values without getting stuck on local extremes. Because the control scheme is not iterative in nature, there is no dependence upon an initial starting point. Furthermore, the control scheme permits a structured prioritization of the constraints should the solution to the problem be infeasible.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a powertrain system comprising an internal combustion engine and a multi-mode transmission including a plurality of torque machines, the method comprising:
   determining, by a controller, minimum and maximum states for an object component of interest based upon a plurality of linear constraints, said linear constraints associated with operating parameters for the torque machines and the multi-mode transmission;
   determining minimum and maximum objective battery powers based upon the minimum and maximum states for the object component of interest;
   when the minimum and maximum objective battery powers are within minimum and maximum battery power limits,
      employing the minimum and maximum states for the object component of interest to control the powertrain system; and
   when the minimum and maximum objective battery powers are outside the minimum and maximum battery power limits,
      executing a problem recomposition process to recompose the minimum and maximum battery power limits and the plurality of linear constraints,
      determining recomposed minimum and maximum states for the object component of interest based upon the recomposed minimum and maximum battery power limits and the recomposed linear constraints, and employing the recomposed minimum and maximum states for the object component of interest to control the powertrain system.

2. The method of claim 1, wherein executing the problem recomposition process to recompose the minimum and maximum battery power limits and the linear constraints comprises:

expanding the minimum and maximum battery power limits to correspond with one of the minimum and maximum states for highest priority independent constraints of the powertrain system; and employing the expanded minimum and maximum battery power limits as recomposed minimum and maximum battery power limits.

3. The method of claim 2, wherein executing the problem recomposition process to recompose the minimum and maximum battery power limits and the linear constraints further comprises:

establishing a preferred priority for a plurality of constraints; and determining final minimum and maximum values for the object component of interest based upon the recomposed minimum and maximum battery power limits while maintaining ones of the plurality of constraints having higher priority and violating ones of the plurality of constraints having lower priority.

4. The method of claim 1, wherein determining minimum and maximum states for the object component of interest comprises determining minimum and maximum torques and rotational accelerations for components of the powertrain system.

5. The method of claim 1, wherein determining minimum and maximum states for the object component of interest comprises executing an objective component equation in accordance with the following relationship:

$$Y1 = aX1 + bX2 + cX3 + d$$

wherein
Y1 represents the object component of interest,
a, b, c, and d are known scalar values, and
X1, X2 and X3 represent highest priority and independent constraints in the powertrain system.

6. The method of claim 5, wherein X1 and X2 represent torque constraints for the torque machines.

7. The method of claim 5, wherein X3 represents torque constraints for the engine.

8. The method of claim 5, wherein Y1 representing the object component of interest comprises one of a torque constraint and an acceleration constraint associated with an element of the powertrain system.

9. The method of claim 5, wherein executing the objective component equation in accordance with the relationship $$Y1 = aX1 + bX2 + cX3 + d$$

comprises subjecting the objective component equation to a plurality of constraints, including $$Y2\_min \leq Y2 = a2*X1 + b2*X2 + c2*X3 + D2 \leq Y2\_max$$

$$Y3\_min \leq Y3 = a3*X1 + b3*X2 + c3*X3 + D3 \leq Y3\_max$$

$$Y4\_min \leq Y4 = a4*X1 + b4*X2 + c4*X3 + D4 \leq Y4\_max$$

$$X1\_min \leq X1 \leq X1\_max$$

$$X2\_min \leq X2 \leq X2\_max$$

$$X3\_min \leq X3 \leq X3\_max$$

wherein
X1 and X2 represent torque constraints associated with the torque machines,
X3 represents torque constraints for the engine,
a2, b2, c2, a3, b3, c3, a4, b4, and c4 represent known scalar values,
Y2, Y3 and Y4 each represent one of a torque constraint and an acceleration constraint associated with an element of the powertrain system, and
D2, D3 and D4 represent known scalar values.

10. The method of claim 1, wherein determining minimum and maximum objective battery powers comprises determining the minimum and maximum objective battery powers in accordance with the following relationship:

$$P\text{bat-min} \leq P = \text{SQRT}(X1^2 + X2^2) \leq P\text{bat-max}$$

wherein
X1 and X2 represent torque constraints associated with the torque machines,
P represents battery power,
Pbat-min represents maximum battery power, and
Pbat-max represents minimum battery power.

11. A method for controlling a powertrain system comprising an internal combustion engine and a multi-mode transmission including a plurality of torque machines, the method comprising:

determining, by a controller, minimum and maximum states for an object component of interest based upon a plurality of linear constraints, said linear constraints associated with operating parameters for the torque machines and the multi-mode transmission;

determining minimum and maximum objective battery powers based upon the minimum and maximum states for the object component of interest; and when the minimum and maximum objective battery powers are outside the minimum and maximum battery power limits, executing a problem recomposition process to recompose the minimum and maximum battery power limits and the plurality of linear constraints, determining recomposed minimum and maximum states for the object component of interest based upon the recomposed minimum and maximum battery power limits and the recomposed linear constraints, and employing the recomposed minimum and maximum states for the object component of interest to control the powertrain system.

12. The method of claim 11, wherein executing the problem recomposition process to recompose the minimum and maximum battery power limits and the linear constraints comprises:

expanding the minimum and maximum battery power limits to correspond with one of the minimum and maximum states for highest priority independent constraints of the powertrain system; and employing the expanded minimum and maximum battery power limits as recomposed minimum and maximum battery power limits.

13. The method of claim 12, wherein executing the problem recomposition process to recompose the minimum and maximum battery power limits and the linear constraints further comprises:

establishing a preferred priority for a plurality of constraints; and determining final minimum and maximum values for the object component of interest based upon the recomposed minimum and maximum battery power limits while maintaining ones of the plurality of constraints having higher priority and violating ones of the plurality of constraints having lower priority.

14. The method of claim 11, wherein determining minimum and maximum states for the object component of interest comprises determining minimum and maximum torques and rotational accelerations for components of the powertrain system.

15. The method of claim 11, wherein determining minimum and maximum states for the object component of interest comprises executing an objective component equation in accordance with the following relationship:

$$Y1 = aX1 + bX2 + cX3 + d$$

wherein
Y1 represents the object component of interest,
a, b, c, and d are known scalar values, and
X1, X2 and X3 represent highest priority and independent constraints in the powertrain system.

16. The method of claim 15, wherein X1 and X2 represent torque constraints for the torque machines.

17. The method of claim 15, wherein X3 represents torque constraints for the engine.

18. The method of claim 15, wherein Y1 representing the object component of interest comprises one of a torque constraint and an acceleration constraint associated with an element of the powertrain system.

19. The method of claim 15, wherein executing the objective component equation in accordance with the relationship $$Y1 = aX1 + bX2 + cX3 + d$$

comprises subjecting the objective component equation to a plurality of constraints, including $$Y2\_min \leq Y2 = a2*X1 + b2*X2 + c2*X3 + D2 \leq Y2\_max$$

$$Y3\_min \leq Y3 = a3*X1 + b3*X2 + c3*X3 + D3 \leq Y3\_max$$

$$Y4\_min \leq Y4 = a4*X1 + b4*X2 + c4*X3 + D4 \leq Y4\_max$$

$$X1\_min \leq X1 \leq X1\_max$$

$$X2\_min \leq X2 \leq X2\_max$$

$$X3\_min \leq X3 \leq X3\_max$$

wherein
X1 and X2 represent torque constraints associated with the torque machines,
X3 represents torque constraints for the engine,
a2, b2, c2, a3, b3, c3, a4, b4, and c4 represent known scalar values,
Y2, Y3 and Y4 each represent one of a torque constraint and an acceleration constraint associated with an element of the powertrain system, and
D2, D3 and D4 represent known scalar values.

* * * * *